Aug. 16, 1966   D. C. REDICK ET AL   3,267,312
DYNAMOELECTRIC MACHINE TERMINAL CONNECTION
Original Filed Sept. 21, 1961   4 Sheets-Sheet 1

INVENTORS
David C. Redick
Willard C. Shaw
Orza D. Heiny
BY
C. R. Meland
THEIR ATTORNEY INVENTORS
David C. Redick
Willard C. Shaw
Arza D. Heiny
BY
C. R. Meland
THEIR ATTORNEY.

INVENTORS
David C. Redick
Willard C. Shaw
Arza D. Heiny
BY
C. R. Meland
THEIR ATTORNEY

United States Patent Office 3,267,312
Patented August 16, 1966

3,267,312
DYNAMOELECTRIC MACHINE TERMINAL
CONNECTION
David C. Redick and Willard C. Shaw, Anderson, and
Arza D. Heiny, Carmel, Ind., assignors to General
Motors Corporation, Detroit, Mich., a corporation of
Delaware
Original application Sept. 21, 1961, Ser. No. 139,746, now
Patent No. 3,219,860, dated Nov. 3, 1965. Divided
and this application July 8, 1964, Ser. No. 381,128
10 Claims. (Cl. 310—239)

This invention relates to brush rigging for dynamoelectric machines and more particularly to brush rigging for an alternating current generator that has built-in diodes. This application is a division of application Serial No. 139,746, filed on September 21, 1961, now Patent No. 3,219,860.

One of the objects of this invention is to provide a brush rigging for dynamoelectric machines wherein spring pressed brushes are located within a brush holder and wherein removable means are provided to maintain the brushes in a retracted position within the brush holder when the dynamoelectric machine is being assembled to thereby prevent the brushes from interfering with assembly of the machine.

Another object of this invention is to provide a brush rigging for an alternating current generator having built-in diodes, the brush rigging including a brush holder that supports a pair of brushes and a pair of male terminals, one of the male terminals being electrically connected with one of the brushes and the other male terminal being electrically connected to a junction point of a pair of diodes.

A further object of this invention is to provide an end frame assembly for a dynamoelectric machine wherein a brush holder is positioned within the end frame and is held to the end frame by a pair of metal fasteners, one of the fasteners serving to electrically connect one brush of the brush holder to the end frame and the other fastener fixing a male terminal in place that is electrically connected with another brush.

Still another object of this invention is to provide a brush rigging arrangement wherein a brush holder is fitted within a dynamoelectric machine end frame and is protected by the end frame and wherein removable rod means are provided which extend through the end frame to hold the brushes of the brush holder in a retracted position during assembly of the dynamoelectric machine.

Further objects and advantages of the present invention will be apparent from the following description, reference being had to the accompanying drawings wherein preferred embodiments of the present invention are clearly shown.

Figures 2, 7:
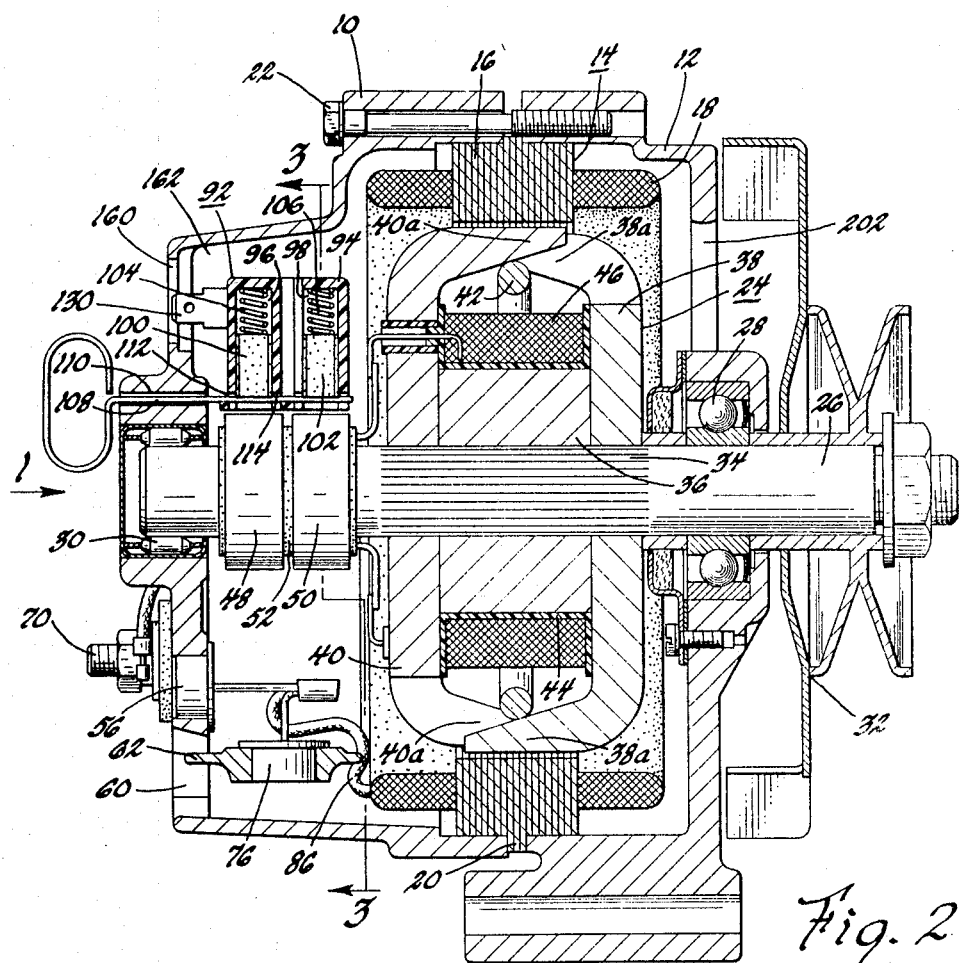
FIGURE 2 is a sectional view taken along line 2—2 of FIGURE 1.
FIGURE 7 is a schematic circuit diagram of an alternator having built-in diodes and made in accordance with this invention.

Referring now to the drawings and more particularly to FIGURE 2, the reference numerals 10 and 12 designate end frames for an alternating current generator that are formed of a metal material such as die cast aluminum. The end frames 10 and 12 clamp a stator assembly generally designated by reference numeral 14. The stator assembly 14 includes a stack of steel stator laminations 16 and a three phase Y-connected stator winding 18 which is fitted within the slots formed in the stator laminations. The intermediate stator laminations are of a larger diameter and form an annular shoulder 20 which is clamped between the end frames 10 and 12. The smaller diameter stator laminations disposed on opposite sides of the larger diameter laminations 20 have an outer surface which engages the inner surface of the end frames 10 and 12. The end frames 10 and 12 are held together by bolts 22 which are threaded into bosses formed in the end frame 12.

The end frames 10 and 12 support a rotor assembly which is generally designated by reference numeral 24. The rotor assembly 24 includes a shaft 26 which is journalled in bearings 28 and 30 supported respectively by the end frames 12 and 10. The shaft 26 carries a combined pulley and fan which is designated by reference numeral 32.

The shaft 26 has a splined section 34. A core member 36 formed of a magnetic material is press fitted to the splined section 34. The pole members 38 and 40 are likewise press fitted to the splined section 34 so that the core member and pole members 38 and 40 rotate with the shaft 26. The pole member 38 has axially extending fingers 38a which interleave with the axially extending fingers 40a of the pole member 40. A noise suppressor ring 42 formed of a nonmagnetic material such as aluminum engages the inner surfaces of the fingers 38a and 40a.

The core member 36 carries a spool 44 formed of electric insulating material and this spool carries a field coil winding 46. The field coil 46 is connected with lead wires which are connected with slip rings 48 and 50 carried by an annular part 52 formed of electric insulating material. The part 52 is press fitted to the shaft 26 and therefore rotates with the shaft.

The end wall of the end frame 10 has three circular openings which respectively receive the semiconductor diodes 54, 56 and 58. The diodes are preferably of the pn junction semiconductor type and may be of the silicon type. Each diode has an outer metal case which forms one terminal side of the diode and each diode has a projecting terminal which forms the other electrical side of the diode. The outer metal cases of the diodes contact the circular walls of the openings formed in end frame 10 and the diodes are press fitted in these circular openings.

Figure 1:
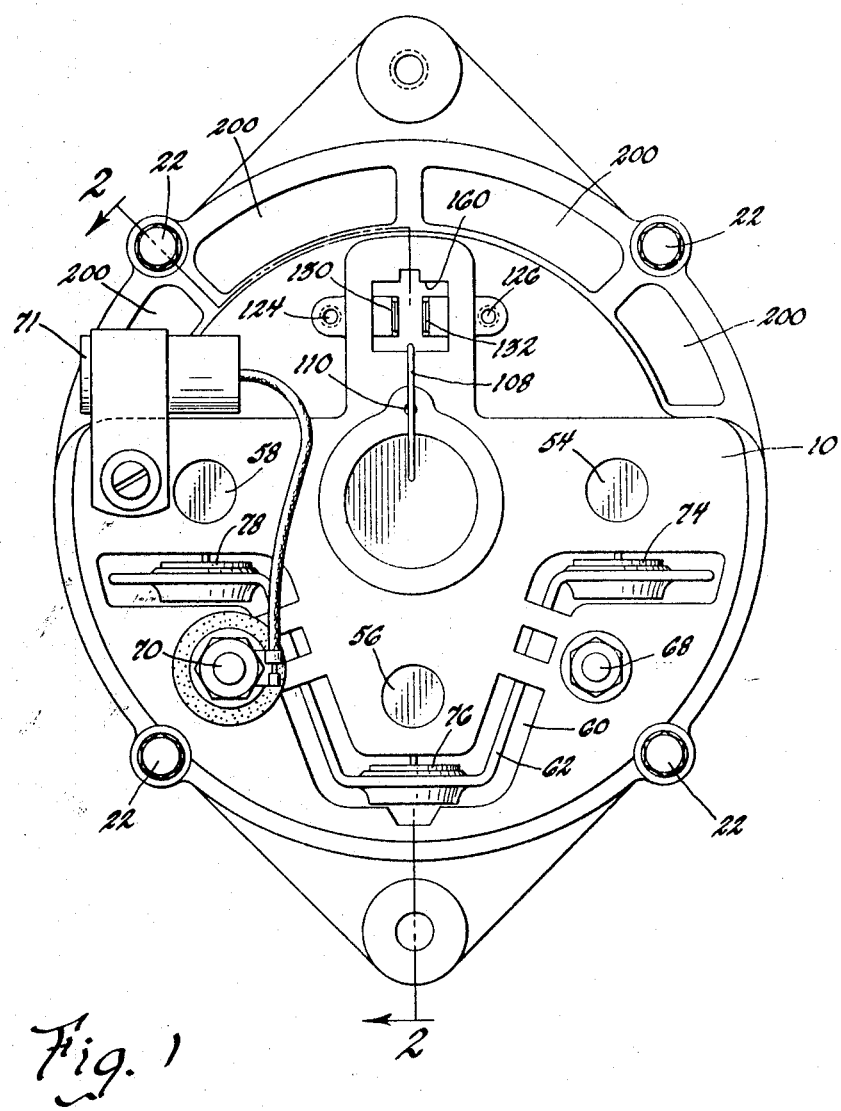
FIGURE 1 is an end view of a dynamoelectric machine that is fitted with a brush rigging made in accordance with this invention.
Figure 3:
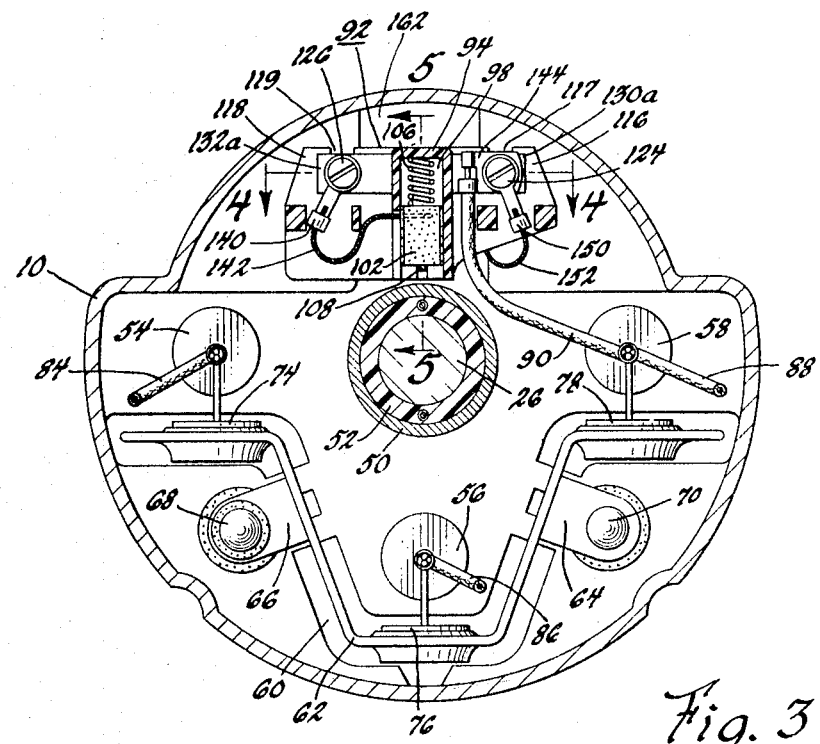
FIGURE 3 is a sectional view taken along line 3—3 of FIGURE 2.
Figure 5:
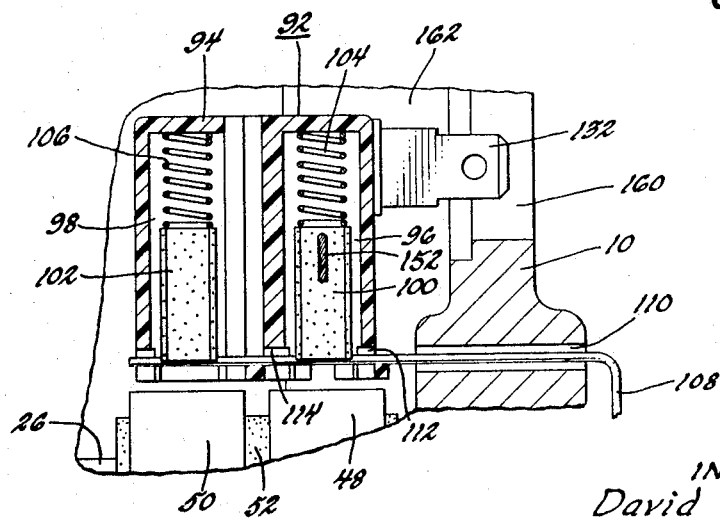
FIGURE 5 is an enlarged sectional view taken along line 5—5 of FIGURE 3.
Figure 4:
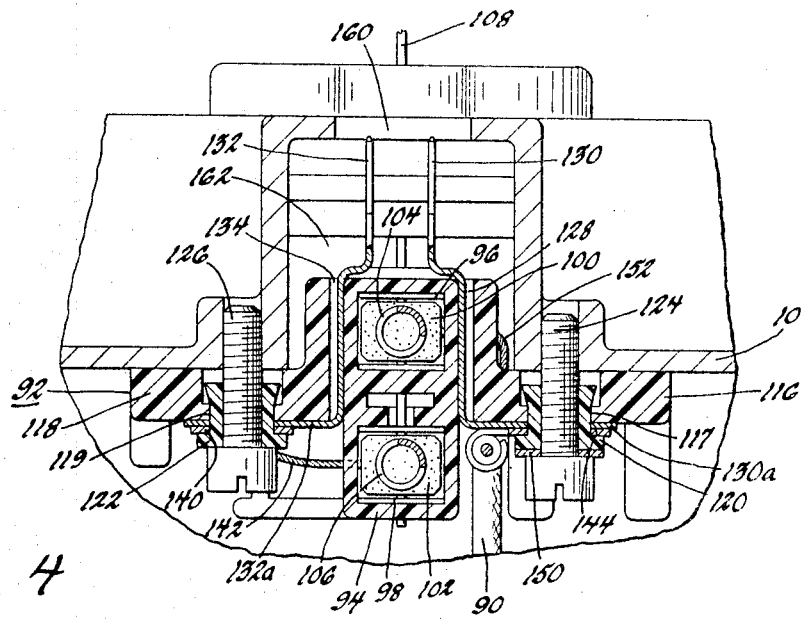
FIGURE 4 is an enlarged sectional view taken along line 4—4 of FIGURE 3.
Figure 6:
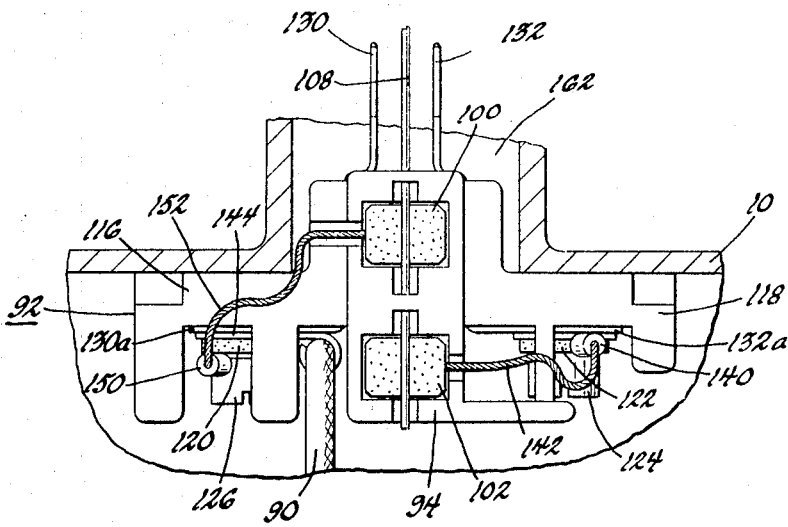
FIGURE 6 is a view partly in section illustrating the lower end of a brush holder assembly made in accordance with this invention.

The end frame 10 is formed with a generally U-shaped air inlet opening 60 as is clearly apparent from FIGURES 1 and 3. Positioned within the end frame 10, is a metal heat sink member 62 which has the same configuration as the slot 60. This metal heat sink member 62 is formed of a good heat conducting material such as aluminum and may be formed from sheet metal aluminum material or may be a die casting. The heat sink member 62 has integral flanges 64 and 66. A terminal stud 68 passes through openings in the end frame 10 and in the flange 66 to secure the heat sink member 62 to the end frame. A second terminal stud 70 passes through the end frame 10 and through the flange 64 to aid in the securement of the heat sink 62 to the end frame 10. The terminal stud 68 is electrically insulated from the heat sink flange 66 by suitable insulating material but is electrically connected with the end frame 10. The terminal stud 70 is electrically connected with the heat sink flange 64 but is electrically insulated from the end frame 10. A condenser 71 is connected between terminal stud 70 and the end frame 10 as is apparent from FIGURE 1.

It is seen from the foregoing that the terminal studs 68 and 70 secure the heat sink member 62 to the end frame 10 and serve as D.C. output terminals for the dynamoelectric machine. The terminal 68 will be at the same electrical potential as the end frame 10 whereas the terminal 70 will be at the same electrical potential as the heat sink 62. This is depicted in the circuit diagram of FIGURE 7.

The heat sink 62 is formed with three circular openings which respectively receive the diodes 74, 76 and 78. The diodes 74, 76 and 78 like the diodes 54, 56 and 58 each have an outer metal case forming one side of the diode and a projecting terminal forming the opposite side of the diode. The diodes 74, 76 and 78 are of a different conductivity type however as compared to diodes 54, 56 and 58. In other words, the metal cases of the diodes mounted in the heat sink 62 are of a different electric polarity from the outer metal cases of the diodes mounted in the end frame 10.

The diodes are connected together and with the three phase Y-connected stator winding 18 in a manner illustrated in the schematic circuit diagram of FIGURE 7. Thus the projecting terminals of diodes 54 and 74 are connected together and to a lead wire 84 which is connected with one of the phase windings of the stator winding 18. In a similar fashion, the projecting terminals of diodes 56 and 76 are connected together and are also connected with a lead wire 86 which is connected with another phase winding of stator winding 18. The projecting terminals of diodes 58 and 78 are connected together and are connected with a lead wire 88 which goes to another phase winding of three phase stator winding 18. In addition, the junction of diodes 58 and 78 and the lead wire 88 is connected with the lead wire 90, the purpose of which is more fully described hereinafter. It can be seen from FIGURE 7, that the diodes are connected in a three phase full wave bridge rectifier network and that the heat sink 62 and the end frame 10 each form common connections for three diodes. It thus is seen that the terminal stud 70 will form one external D.C. output terminal for the generator whereas the terminal stud 68 which is connected with the end frame 10 forms the other D.C. output terminal.

The brushholder assembly for the dynamoelectric machine will now be described. The brushholder assembly is generally designated by reference numeral 92. This brushholding assembly includes a brushholder 94 which is formed of a suitable moldable plastic insulating material. The brushholder 94 has a pair of brushholding chambers 96 and 98 which receive the brushes 100 and 102. The brush 100 is urged into engagement with slip ring 48 by a spring 104 whereas the brush 102 is urged into engagement with slip ring 50 by a spring 106.

The brushes 100 and 102 are held in a retracted position away from the slip rings 48 and 50 during assembly of the end frames 10 and 12 by a rod member 108. The rod member passes through an opening 110 formed in the end frame 10. This rod member also passes through openings 112 and 114 formed in the brushholder 94. When the end frames 10 and 12 have been assembled to the stator assembly 14, the rod member 108 can be pulled out and the brushes 100 and 102 are then pushed into engagement with the slip rings 48 and 50 by the springs. By keeping the brushes in a retracted position, the brushes do not interefere with the assembly of one end of the shaft 26 into the bearing 30 during the time that the end frames are being secured together.

The plastic brushholder 94 has side flanges 116 and 118 that are formed with slots 117 and 119 that respectively receive the insulators 120 and 122. Fitted within the insulator 120 is a metal fastener 124 which is threaded into the end frame 10. In a similar fashion, a metal fastener 126 passes through the insulator 122 and is likewise threaded into the end frame 10. The insulators 120 and 122 are preferably slitted longitudinally partly along their length so that they are expandable.

The brushholder 94 has a slot 128 which receives a male terminal 130. The male terminal 130 has an opening formed in a side flange 130a which receives the insulator 120. Another male terminal 132 is positioned within a slot 134 formed in the brushholder 94. The male terminal 132 has an opening in side flange 132a which receives the insulator 122 and it therefore is seen that the fasteners 124 and 126 and the insulators 120 and 122 serve to secure the male terminals 130 and 132 in place.

The insulator member 122 carries a terminal 140 which is connected with lead wire 142. The lead wire 142 is connected with the brush 102 and it therefore can be seen that the brush 102 is electrically connected with the male terminal 132.

The insulator member 120 carries a terminal 144 which is connected with lead wire 90. The lead wire 90 as pointed out hereinbefore is connected with the projecting terminals of diodes 58 and 78 as is seen from FIGURE 3 and the schematic circuit diagram of FIGURE 7. With this arrangement, it can be seen that the male terminal 130 is connected with the junction point of diodes 58 and 78 and this terminal can therefore be used to energize a relay coil or other device where the relay coil is connected with the male terminal 130 and with a D.C. output terminal of the bridge rectifier network.

The metal fastener 124 carries a terminal 150 which is connected with a lead wire 152. It is seen that the lead wire 152 is connected with the brush 100 and the brush 100 is therefore electrically connected to the end frame 10 by the metal fastener 124. It is of course appreciated that the insulator 120 insulates the terminal 150 from the male terminal 130 and also from the terminal 144.

The male terminals 130 and 132 are located in alignment with an opening 160 formed in the end frame 10 and it is seen that these male terminals and a portion of the brushholder 94 are located in a compartment 162 formed in the end frame 10.

In operation of this alternator and referring to FIGURE 7, it is seen that field current can be supplied to the field winding 46 via the terminal 132. This field current can be supplied from the three phase full wave bridge rectifier network that is built into the dynamoelectric machine through a suitable voltage regulating means. It is appreciated that as the rotor of the machine rotates and when the field winding 46 is supplied with direct current, an alternating current is induced in the three phase stator winding 18. This is, of course, rectified to direct current by the built-in diodes which form the three phase full wave bridge rectifier network. During rotation of the rotor air enters the machine through openings 60 and 200 formed in end frame 10 and exits through openings 202 formed in end frame 12.

The brushholder of this invention has several advantages. By using the rod 108, it is possible to maintain the brushes out of the way when the end frames 10 and 12 are assembled together. In addition, the brushholder is positioned within a protected position in the end frame 10 and carries a pair of male terminals one of which can be connected with a voltage regulator and the other of which can be connected with a relay or other load to be actuated. It will, of course, be appreciated that a complementary female terminal may be plugged into the end frame 10 to receive the male terminals 130 and 132 making it a simple matter to connect the dynamoelectric machine of this invention with the other parts of this system that are required.

While the embodiments of the present invention as herein disclosed constitute a preferred form, it is to be understood that other forms might be adopted.

We claim:

1. In combination, an alternating current generator having a three phase output winding and an end frame, a first group of semiconductor diodes of one conductivity type, a second group of semiconductor diodes of an opposite conductivity type, means connecting said diodes together to form a three phase full wave bridge rectifier network connected with said output winding, a rotor member, slip rings carried by said rotor member, a brush support member formed of insulating material supported by said end frame and including brushes engageable with said slip ring assembly, first and second fastener means for securing said brush support member to said end frame, first and second terminals supported by said brush support member, means electrically connecting one of the brushes carried by said brush support member with one of said terminals and means electrically connecting the other terminal with a junction point of a pair of said diodes of opposite conductivity type, said terminals forming means that are adapted to be connected to apparatus external of said generator.

2. An end frame assembly for a dynamoelectric machine comprising, a metal end frame, a first group of semiconductor diodes of one conductivity type, a second group of semiconductor diodes of an opposite conductivity type, means electrically connecting said diodes to form a three phase full wave bridge rectifier network, a brush support member formed of insulating material supported by said end frame carrying first and second terminals, at least one brush slidable in said brush support member, means electrically connecting one of said terminals with said brush, and means electrically connecting a junction point of two diodes of opposite conductivity types with said other terminal, said terminals being adapted to be connected with apparatus exterior of said generator.

3. In combination, an alternating current generator having a three phase output winding and an end frame, a first group of semiconductor diodes of one conductivity type, a second group of semiconductor diodes of an opposite conductivity type, means electrically connecting said diodes in a three phase full wave bridge rectifier network and with said output winding, a brush support member formed of insulating material secured to the end frame of said generator, at least one brush slidably disposed in said brush support member, a terminal fitted within said brush support member, a metal fastener securing said brush support member to said end frame and holding said terminal in place within said brush support member, means electrically connecting said brush with said fastener, and means electrically connecting said terminal with a junction point of two diodes of opposite conductivity types, said terminal being accessible from the exterior of said generator.

4. In combination, an alternating current generator having a three phase output winding and an end frame, a first group of semiconductor diodes of one conductivity type, a second group of semiconductor diodes of an opposite conductivity type, means connecting said diodes together to form a three phase full wave bridge rectifier network connected with said output winding, a rotor member including a field winding, slip rings carried by said rotor member connected with said field winding, a brush support member formed of insulating material supported by said end frame and including brushes engageable with said slip rings, a terminal supported by said brush support member, and means electrically connecting said terminal with a junction point of a pair of said diodes of opposite conductivity type, said terminal being adapted to be connected with apparatus exterior of said generator.

5. In combination, an alternating current generator having a three phase output winding and an end frame, a first group of semiconductor diodes of one conductivity type, said first group of diodes being supported by said end frame with said end frame forming a common electrical connection for one side of said diodes, a second group of semiconductor diodes of an opposite conductivity type, a metal heat sink supported by said end frame and electrically insulated therefrom, said second group of semiconductor diodes being supported by said metal heat sink with said metal heat sink forming a common electrical connection for one side of said second group of diodes, a rotor member including a field winding, slip rings carried by said rotor member, a brush support member formed of insulating material supported by said end frame and including brushes engageable with said slip rings, means connecting pairs of diodes from said two groups together and to said output winding, a terminal supported by said brush support member, and means electrically connecting said terminal to a junction point of a pair of said diodes of opposite conductivity type.

6. An end frame assembly for a dynamoelectric machine comprising, an end frame, a first group of semiconductor diodes of one conductivity type located within said end frame, a second group of semiconductor diodes of an opposite conductivity type located within said end frame, means electrically connecting said diodes to form a three phase full-wave bridge rectifier network, a brush support member formed of insulating material supported by said end frame, two terminals supported by said brush support member, and means electrically connecting a junction point of two diodes of opposite conductivity type with one of said terminals, said terminal being adapted to energize an electrical load between it and one of the direct current output terminals of said bridge rectifier network.

7. In combination, an alternating current generator having a three phase output winding and an end frame, an opening in said end frame, a first group of semiconductor diodes of one conductivity type, a second group of semiconductor diodes of an opposite conductivity type, means connecting said diodes together to form a three phase full wave bridge rectifier network connected with said output winding, a rotor member, a field winding carried by said rotor member, slip rings carried by said rotor member connected with said field winding, a brush support member formed of insulating material located within said end frame and supported thereby having brushes engageable with said slip rings, a terminal supported by said brush support member located in alignment with said opening in said end frame, and means electrically connecting said terminal with a junction point of a pair of said diodes of opposite conductivity type, said opening providing access to said terminal.

8. In combination, an alternating current generator having a three phase output winding and an end frame, a first group of semiconductor diodes of one conductivity type, a second group of semiconductor diodes of an opposite conductivity type, means connecting said diodes together to form a three phase full wave bridge rectifier network connected with the phase windings of said output winding, a rotor member including a field winding, slip rings carried by said rotor member connected with said field winding, a brush support member formed of insulating material supported by said end frame and including brushes engageable with said slip rings, a first terminal supported by said brush support member which is electrically connected with one of said brushes, a second terminal supported by said brush support member, said first and second terminals providing connecting means for said generator which is accessible from the exterior of said generator, and means electrically connecting said second terminal with at least one phase winding of said three phase winding.

9. In combination, an alternating current generator having a three phase output winding and a frame, rectifier means connected with said three phase output winding for providing a direct current output, a rotor member including a field winding, slip rings carried by said rotor member connected with said field winding, a brush support member formed of insulating material supported by said frame and including brushes engageable with said slip rings, a first terminal supported by said brush support member, said first terminal being electrically connected with one of said brushes, and a second terminal supported by said brush support member, said second terminal being electrically connected with at least one phase winding of said output winding, said brush support member electrically insulating said first terminal from said second terminal.

10. In combination, an alternating current generator having a three phase output winding and a frame, a first group of semiconductor diodes of one conductivity type, a second group of semiconductor diodes of an opposite conductivity type, means connecting said diodes together to form a three phase full wave bridge rectifier network connected with the phase windings of said output winding, a rotor member including a field winding, at least one slip ring carried by said rotor member connected to said field winding, a brush support member formed of insulating material supported by said frame and carrying a brush which engages said slip ring, a first terminal supported by said brush support member which is electrically connected with said brush, a second terminal supported by said brush support member and electrically insulated from said first terminal by the insulating material of said brush support member, said first and second terminals providing connecting means for said generator which is accessible from the exterior of said generator, and means electrically connecting said second terminal with a junction of two diodes of opposite conductivity type.

References Cited by the Examiner
UNITED STATES PATENTS

| | | | |
|---|---|---|---|
| 3,041,484 | 6/1962 | Freer et al. | 310—68.4 |
| 3,078,409 | 2/1963 | Bertsche et al. | 310—68.4 |
| 3,106,656 | 10/1963 | Merriam | 310—239 |

MILTON O. HIRSHFIELD, *Primary Examiner.*

ORIS L. RADER, *Examiner.*

A. J. ROSSI, *Assistant Examiner.*